Sept. 30, 1952     W. J. McCUNE, JR     2,612,452
PHOTOGRAPHIC PRODUCT
Filed Nov. 2, 1948

INVENTOR
William J. McCune, Jr.
BY Donald L. Brown
and Oliver W. Hayes
Attorneys Patented Sept. 30, 1952

2,612,452

UNITED STATES PATENT OFFICE 2,612,452

PHOTOGRAPHIC PRODUCT

William J. McCune, Jr., South Lincoln, Mass., assignor to Polaroid Corporation, Cambridge, Mass., a corporation of Delaware Application November 2, 1948, Serial No. 57,847

3 Claims. (Cl. 95—88)

1

This invention relates to photography and more particularly to improved photographic products of the general type described in the copending applications of Edwin H. Land, Serial No. 782,117, filed October 25, 1947 (now Patent No. 2,579,587, issued December 25, 1951) and Otto E. Wolff and Murry N. Fairbank, Serial No. 790,454, filed December 9, 1947. The above-mentioned applications describe a double-roll product comprising a first roll of a photosensitive sheet and a second roll of an image-carrying sheet. This invention is primarily directed to an improved image-carrying sheet particularly adapted to be formed into a roll.

A principal object of the invention is to provide such an image-carrying sheet which contains at least one image area separable from the remainder of the sheet.

Another object of the invention is to provide such an image-carrying sheet having a plurality of separable image areas wherein each image area is defined by perforations and the perforations are so arranged that the sheet can be formed into a roll of relatively small radius without creating any sharp creases which might impair adjacent image area surfaces.

Still another object of the invention is to provide such an image-carrying sheet wherein the perforations are arranged to assist in tearing the separable image areas therefrom along predetermined lines without danger of tearing the picture area.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

2

This invention relates primarily to improvements in image-carrying sheets of the type described in the above-mentioned copending applications of Edwin H. Land and Otto E. Wolff et al. In those applications there is described a double-roll product comprising a roll of photosensitive sheet and a roll of image-carrying sheet. These two rolls are particularly adapted to be separately mounted in a camera so as to permit exposure of a photosensitive layer carried by the roll of photosensitive sheet and advancement of the exposed area into superposition with an image area on the image-carrying sheet. The image-carrying sheet preferably includes a plurality of liquid-carrying containers, there being one container for each image area, so that a processing liquid can be released from each container and spread between these two superposed sheets. Spreading of this liquid laminates the two sheets together and accomplishes a predetermined processing thereof, this processing preferably comprising the development of a negative image in the photosensitive layer and the development of a positive image on the corresponding image area of the image-carrying sheet. At the completion of such a processing it is desired to separate the positive image area from the lamination to permit viewing of the positive image, it being preferable to maintain the other portions of the two laminated sheets in contact so that they confine therebetween any excess of the processing liquid.

This invention is primarily directed to improvements in such image-carrying sheets and particularly to the arrangement of the perforations which define the separable positive image areas. These perforations are so arranged that the positive image area can be readily separated along a predetermined path to give an attractive edge to the positive image. Additionally, the perforations are so arranged that, when the product is rolled up for insertion in the camera, there are created no sharp creases which might scratch the adjacent image area and thus produce scratches or other marks on the finished positive images.

Figure 3:
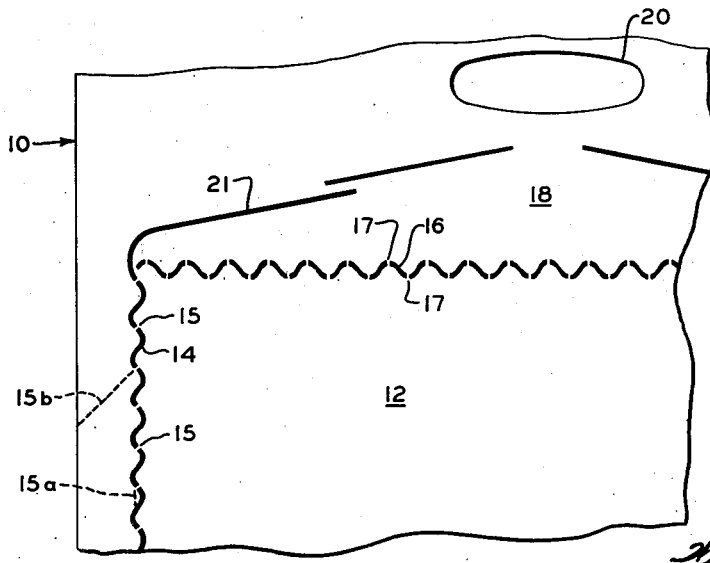
Fig. 3 is a diagrammatic enlarged plan view of a portion of Fig. 1.

Referring now to the drawing, there is shown one preferred embodiment of the invention. In the various figures, like numbers refer to like elements and 10 represents the image-carrying sheet, this sheet preferably carrying a plurality of image areas 12, each image area being preferably rectangular and roughly defined by perforations completely surrounding the image area. The perforations are preferably in the form of a curved line resembling a deckle, the longitudinal perforations being indicated at 14 and the transverse perforations being indicated at 16. Unperforated portions of the sheet along the edges of the image area serve to keep the image area attached to the remainder of the image-carrying sheet, the longitudinal unperforated portions being shown at 15 and the transverse unperforated portions being shown at 17. As can be seen most clearly in Fig. 3, the unperforated portions 15, on the longitudinal edges of the image area, are preferably arranged along the curved line defined by the perforations 14 so that these unperforated portions are spaced outwardly of those peaks of the curved line nearest the image area. However, the unperforated portions 17, on the transverse edges of the image area, are preferably arranged alternately at the points of the maximum variation of the curved line defined by the transverse perforations 16, thereby defining two spaced-apart parallel lines of unperforated portions at each transverse edge. Thus, when the sheet 10 is rolled up in a roll of relatively small diameter, the two transverse spaced-apart parallel lines of unperforated portions 17 form two hinge lines and thereby prevent the formation of a sharp crease at each transverse edge of the image area.

Adjacent one end of each image area there is provided an initial tear-out portion 18 which is defined by an initial tear-out hole 20 and a pair of oblique initial tear-out perforations 21 which preferably extend from the adjacent corners of the image area to the vicinity of the tear-out hole 20.

Figure 2:
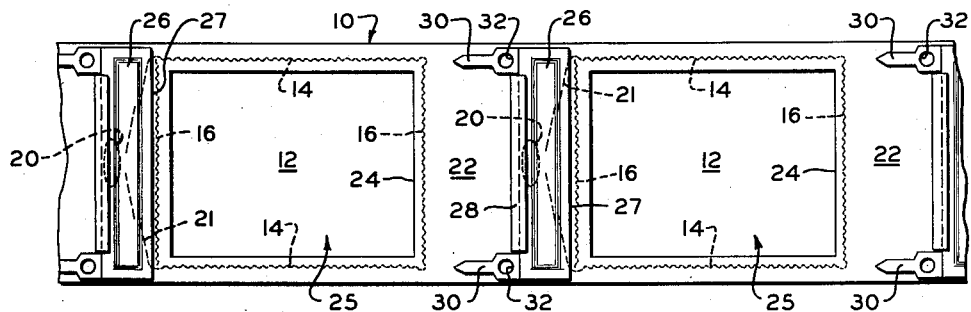
Fig. 2 is a diagrammatic schematic plan view of the inner surface (i. e., the surface carrying the positive image) of the image-carrying sheet of Fig. 1.

On that surface of the image-carrying sheet which is to be brought into superposed face-to-face relation with the exposed photosensitive sheet (see Fig. 2) there is preferably provided a mask 22 having edges 24 defining a rectangular hole 25 therein, this hole defining the edges of that portion of the image area 12 which is to receive the positive image by the above-mentioned transfer process. As can be seen best in Fig. 2, the hole 25 is slightly smaller than the image area defined by perforations 14 and 16, thereby providing a border for the positive image formed on image area 12. A liquid-carrying container 26 is preferably secured to the outer surface of mask 22 adjacent one edge of hole 25 such as by means of a strip of tape 28. This container is positioned so that a liquid discharge mouth 27 thereof may discharge the contained liquid for spreading across the image area 12. For trapping excess liquid spread from container mouth 27 across image area 12 there is provided a liquid trap preferably comprising a pair of trapping elements 30. A stop hole 32 is preferably provided in each trapping element 30 for coacting with stop elements in the camera to predeterminedly position the image-carrying sheet within the camera.

In the manufacture of the product described above the image-carrying sheet is preferably formed of baryta paper which has been treated in accordance with the teachings set forth in the above-mentioned application of Otto E. Wolff et al. The perforations are then preferably made in this sheet and the mask 22 is laminated to the treated surface of this sheet 10. Thereafter the containers 26 are secured to the mask by means of the tapes 28 and the trapping elements 30 are suitably secured in their proper positions. The sheet is then formed into a roll, the inner diameter of the roll being in the neighborhood of seven-eighths of an inch, the outer end of the roll being suitably sealed to prevent unrolling. The thus formed roll is preferably attached to a roll of a silver halide photosensitive sheet, of the type described in the above-mentioned Wolff et al. application, and the product is ready for use.

Figure 1:
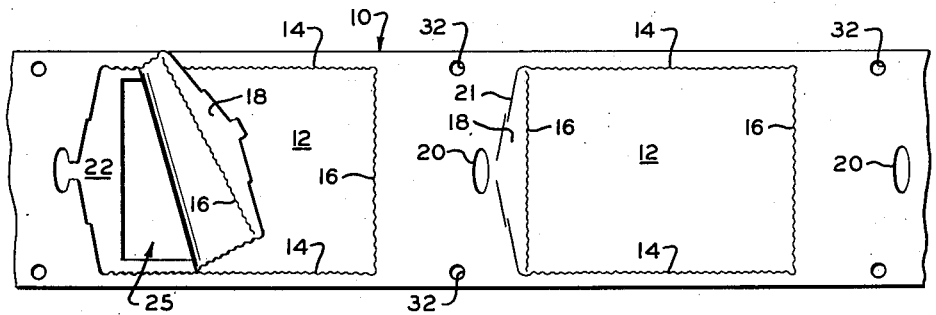
Figure 1 is a diagrammatic schematic plan view of the outer surface of an image-carrying sheet manufactured in accordance with the present invention.

In the use of the present invention the image-carrying sheet 10, after positioning in the camera, is superposed with an exposed area of the silver halide photosensitive sheet and then passed between a pair of pressure-applying surfaces such as a pair of pressure rolls. As the superposed sheets pass between these rolls the processing liquid is forced from the mouth 27 of the container 26 and spread across the adjacent image area 12, the liquid at the edges and ends of the image area being spread between the mask 22 and the surface of the photosensitive sheet. The excess liquid being spread, when the edge of the image area 12 is reached, is trapped between the trapping elements 30 which act to separate the rolls and thus relieve the spreading pressure on the liquid. The liquid spread between the photosensitive sheet and the image-carrying sheet 10 laminates these two sheets together and concurrently develops a negative image in the photosensitive sheet and a positive image on the adjacent surface of image area 12. At the completion of this processing the positive image area 12 is separated from the lamination of the two layers. This separation operation is indicated best at the left-hand side of Fig. 1 where one image area is shown as being partially torn out. Tearing of this image area is accomplished by inserting a fingernail through the initial tear-out hole 20 and separating initial tear-out portion 18 from sheet 10 along perforation lines 21. Continued pulling, in a direction from the left-hand end towards the other end, ruptures the unperforated portions 15 along the two longitudinal edges of the image area starting at the left-hand edge of Fig. 1 and continuing until the transverse perforation line at the right-hand edge of the image area is reached. For clarity of illustration the image area being torn out in Fig. 1 is shown with one edge being separated ahead of the other longitudinal edge. Actually, both longitudinal edges are usually torn simultaneously. It should be noted in this connection that the transverse unperforated portions connecting the initial tear-out portion 18 with the image area are strong enough in the aggregate to transmit the tearing force from the initial tear-out portion 18 to the longitudinal unperforated portions 15 and to rupture these latter portions.

The preferred arrangement of the longitudinal unperforated portions 15, wherein these portions are arranged along the curved perforation line so that they are spaced outwardly of the image area, has a definite advantage since the tearing stress at each perforation is parallel to the general direction of the image area edge. Thus, if the unperforated portion does not shear along a continuation of the curved perforation line but rather shears parallel to the image area edge (such as along dotted line 15a in Fig. 3) then this shear will strike the next curve and the separation along the curved perforation line will commence again. These unperforated portions are also preferably spaced inwardly from the outer extremities of the curved line so as to prevent accidental tearing at the edge of sheet 10. However, this tearing at the outer edge of sheet 10 (for example, along dotted line 15b in Fig. 3) is not serious, since it does not affect the image area and any portion of the outer edge remaining attached to the positive image area can be removed from this image area after the image area has been taken from the camera. The illustrated preferred positioning of the longitudinal unperforated portions 15 on those portions of the curved line, as it goes from maximum outside deviation to minimum deviation, as measured along the curved line from the transverse edge nearest the initial tear-out portion, has the advantage that any shear (15a) parallel to the image area edge is a shear of the portion of sheet 10 which lies outside of the image area 12. Thus this unwanted shear does not tear the image area edge so as to spoil the deckle. When tearing along the transverse lines it is desired that the shear force have a large component normal to this transverse edge. This can be readily accomplished since only one transverse edge is torn at a time. Thus, when the transverse edge of the image area of Fig. 1 is reached, the tearing thereof may be readily accomplished by exerting a force on image area 12 either upwardly or downwardly as seen in Fig. 1.

When the sheet 10 comprises paper, the preferred arrangement of the perforations described above is particularly advantageous if the longitudinal edges of the sheet extend in the direction of the paper "grain," i. e., parallel to the direction in which the paper moved through the paper-making machine during its manufacture. This is due to the fact that the paper will tear more easily along its "grain" than across its "grain." Thus, any failures of the longitudinal unperforated portions to shear will cause a tearing along a line similar to line 15a in Fig. 3.

In a preferred form of the invention the traps 30, the liquid carried by the containers 26, and the containers 26 are formed of the materials listed as being preferable in the above-mentioned Wolff et al. application. The mask 22 is preferably formed in accordance with the teachings in the copending application of Howard G. Rogers et al., Serial No. 6,058, filed February 3, 1948.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. As a new product for use in a photographic transfer process as image-receptive material for receiving a transfer image, a flexible, water-permeable, image-carrying sheet material comprising a plurality of removable sections of rectangular shape providing individual image areas which are each adapted to have a transfer image formed thereon and which are sequentially spaced lengthwise of said sheet, each said image area lying within the margins of said sheet and being entirely surrounded by portions of said sheet located between said image area and the marginal edges of the sheet, said sheet being provided with perforations which extend therethrough and which define the longitudinal and transverse edges of each said removable rectangularly shaped area whereby each said area is separable from the remainder of the sheet, the perforations around each said image area being in the form of curved lines resembling a deckle but spaced apart with respect to each other to provide unperforated portions along the longitudinal and transverse edges of each said image area whereby said unperforated portions removably attach each image area to said sheet, said unperforated portions on the longitudinal edges of each said image area being arranged along the curved lines defined by said perforations and spaced outwardly from those peaks of the curved lines nearest the image area which they define, said unperforated portions on each said transverse edge of each image area being alternately arranged at the points of maximum variations of the curved lines, and said sheet being rollable lengthwise of itself into a roll with said perforations at the transverse edges of each image area providing hinge lines which facilitate the formation of said roll.

2. A flexible, water-permeable, image-carrying sheet material for use in a photographic transfer process as image-receptive material for receiving a transfer image, said image-carrying sheet comprising a plurality of removable sections of rectangular shape providing individual image areas which are each adapted to have a transfer image formed thereon and which are sequentially spaced lengthwise of said sheet, each said image area lying within the margins of said sheet and being entirely surrounded by portions of said sheet located between said image area and the marginal edges of the sheet, said sheet being provided with perforations which extend therethrough and which define the longitudinal and transverse edges of each said removable rectangularly shaped area whereby each said area is separable from the remainder of the sheet, the perforations around each said image area being in the form of curved lines resembling a deckle edge but spaced apart with respect to each other to provide unperforated portions along the longitudinal and transverse edges of each said image area whereby said unperforated portions removably attach each image area to said sheet, said unperforated portions on the longitudinal edges of each said image area being arranged along the curved lines defined by said perforations and spaced outwardly from those peaks of the curved lines nearest the image area which they define, said unperforated portions on each said transverse edge of each image area being alternately arranged at the points of maximum variations of the curved lines, each said image area having associated therewith an initial tear-out portion provided in part by an opening through said sheet adapted to form a finger hole which is positioned adjacent a transverse edge of said image area and further provided by a plurality of straight-line perforations through said sheet which extend from each corner of the transverse edge of said image area adjacent said finger hole towards each other and towards said finger hole, each initial tear-out portion being attached to the transverse edge of the image area with which it is associated by said unperforated portions along said transverse edge.

3. A flexible, water-permeable, image-carrying, sheet material for use in a photographic transfer process as image-receptive material for receiving a transfer image, said image-carrying sheet comprising at least one removable section of rectangular shape providing an image area which is adapted to have a transfer image formed thereon and which lies within the margins of said sheet and is entirely surrounded by portions of said sheet located between said area and the marginal edges of said sheet, said sheet being provided with perforations which extend therethrough and which define the longitudinal and transverse edges of said removable, rectangularly shaped image area whereby said image area is separable from the remainder of said sheet, said perforations being in the form of curved lines resembling a deckle and being spaced apart with respect to each other to provide unperforated portions along said longitudinal and transverse edges of said image area whereby said unperforated portions removably attach said image area to said sheet, said unperforated portions at said transverse edges being alternately arranged at the points of maximum variation of said curved lines, said image area having associated therewith an initial tear-out portion provided in part by an opening through said sheet adapted to form a finger hole which is positioned adjacent a transverse edge of said image area and further provided by a plurality of perforations through said sheet which extend from each corner of the transverse edge of said image area adjacent said finger hole toward each other and toward said finger hole, each initial tear-out portion being attached to the transverse edge of the image area with which it is associated by said unperforated portions along said transverse edge.

WILLIAM J. McCUNE, Jr.

REFERENCES CITED

The following references are of record in the file of this patent:

UNITED STATES PATENTS

| Number | Name | Date |
| --- | --- | --- |
| 329,562 | Howe | Nov. 3, 1885 |
| 711,981 | Lankenau | Oct. 28, 1902 |
| 917,310 | Kelly et al. | Apr. 6, 1909 |
| 1,212,137 | Gindele | Jan. 9, 1917 |
| 1,251,766 | Gindele | Jan. 1, 1918 |
| 1,827,636 | Ames | Oct. 13, 1931 |
| 1,840,908 | Lozier | Jan. 12, 1932 |
| 1,861,361 | Rich | May 31, 1932 |
| 2,225,048 | Hosin | Dec. 17, 1940 |
| 2,305,003 | Heit | Dec. 15, 1942 |
| 2,444,853 | Scharf | July 6, 1948 |